United States Patent
Hikosaka (10) Patent No.: US 9,879,719 B2
(45) Date of Patent: Jan. 30, 2018

(54) SUPPORTING STRUCTURE FOR GEAR OF OUTBOARD MOTOR

(71) Applicant: SUZUKI MOTOR CORPORATION, Hamamatsu-Shi, Shizuoka (JP)

(72) Inventor: Tomokazu Hikosaka, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 15/334,453

(22) Filed: Oct. 26, 2016

(65) Prior Publication Data

US 2017/0159705 A1 Jun. 8, 2017

(30) Foreign Application Priority Data

Dec. 4, 2015 (JP) ................ 2015-237862

(51) Int. Cl.
*F16C 25/08* (2006.01)
*B63H 20/14* (2006.01)
*F16H 1/22* (2006.01)
*F16C 19/54* (2006.01)
*F16C 19/56* (2006.01)

(52) U.S. Cl.
CPC .......... *F16C 25/083* (2013.01); *B63H 20/14* (2013.01); *F16C 19/547* (2013.01); *F16C 19/56* (2013.01); *F16H 1/222* (2013.01); *F16C 2361/65* (2013.01)

(58) Field of Classification Search
CPC ...... F16C 19/547; F16C 19/56; F16C 25/563; F16C 20/14; F16C 2361/65; F16C 2240/14; F16C 2229/00; F16H 1/222

USPC ....... 384/452, 551, 559, 563–565, 571, 589, 384/581; 440/75, 80

See application file for complete search history.

(56) References Cited

U.S. PATENT DOCUMENTS

| | | | | |
|---|---|---|---|---|
| 4,994,007 A * | 2/1991 | Miura | ..................... | F16H 3/663 475/283 |
| 5,921,828 A * | 7/1999 | Ogino | ..................... | B63H 5/10 192/48.7 |
| 6,123,591 A * | 9/2000 | Onoue | ................... | B63H 21/28 192/48.91 |
| 6,199,630 B1 * | 3/2001 | Blundell | ............. | E21B 33/0415 166/75.14 |

(Continued)

FOREIGN PATENT DOCUMENTS

| | | |
|---|---|---|
| JP | 2012187967 A | 10/2012 |
| JP | 2013107604 A | 6/2013 |

*Primary Examiner* — Marcus Charles
(74) *Attorney, Agent, or Firm* — Troutman Sanders LLP (57) ABSTRACT

A shift mechanism includes a second driven gear, a first conical roller bearing and a second conical roller bearing, a biasing member, a first spacer, and a nut. The second driven gear meshes with a driving gear. The first and second conical roller bearings are disposed on an outer periphery of a tubular portion of the second driven gear in directions opposite from one another. The biasing member biases one of inner or outer races of the first or second conical roller bearings in directions separate from one another. The first spacer maintains a distance between the other ones. The nut holds the first conical roller bearing and the second conical roller bearing to the tubular portion of the second driven gear. One of the inner or outer races of the first and second conical roller bearings are relatively displaceable in an axial direction.

4 Claims, 5 Drawing Sheets

(56) References Cited

U.S. PATENT DOCUMENTS

| | | | | |
|---|---|---|---|---|
| 6,386,350 B1* | 5/2002 | Sato | ............... | B63H 20/20 192/109 A |
| 6,893,305 B2* | 5/2005 | Natsume | ............... | B63H 20/14 440/75 |
| 7,621,792 B2* | 11/2009 | Fukuoka | ............... | B63H 20/245 440/89 R |
| 8,087,958 B2* | 1/2012 | Yukishima | ............... | B63H 20/20 440/75 |
| 8,931,373 B2* | 1/2015 | Suzuki | ............... | F16H 37/06 74/650 |
| 9,522,720 B2* | 12/2016 | Nakamura | ............... | B63H 20/20 |
| 2002/0093239 A1* | 7/2002 | Sugden | ............... | E21C 25/16 299/71 |
| 2003/0064853 A1* | 4/2003 | Rockey | ............... | F16D 57/04 475/331 |
| 2006/0133710 A1* | 6/2006 | Kawaguchi | ............... | F16C 19/364 384/571 |
| 2010/0124858 A1* | 5/2010 | Okabe | ............... | B63H 23/30 440/75 |
| 2012/0076450 A1* | 3/2012 | Suma | ............... | B60B 27/00 384/452 |
| 2012/0231683 A1* | 9/2012 | Kawaguchi | ............... | B63H 20/20 440/75 |
| 2014/0069218 A1 | 3/2014 | Kawaguchi | | |

* cited by examiner

SUPPORTING STRUCTURE FOR GEAR OF OUTBOARD MOTOR

CROSS-REFERENCE TO RELATED APPLICATIONS

This application is based upon and claims the benefit of priority of the prior Japanese Patent Application No. 2015-237862, filed on Dec. 4, 2015, the entire contents of which are incorporated herein by reference.

BACKGROUND OF THE INVENTION

Field of the Invention

The present invention relates to a supporting structure for a gear of an outboard motor. The present invention especially relates to a supporting structure for a driven gear provided to a shift mechanism of the outboard motor.

Description of the Related Art

A shift mechanism of an outboard motor intermits a rotative power and switches a rotation direction between a drive shaft and a propeller shaft that includes a pusher propeller. The drive shaft rotates by the rotative power output from a driving power source of the outboard motor. There has been provided this shift mechanism that includes, for example, a driving gear that rotates together with a drive shaft, a pair of driven gears that mesh with the driving gear and rotate in directions opposite from one another, and a clutch mechanism that intermits a rotative power between the pair of driven gears and a propeller shaft. With this shift mechanism, the clutch mechanism switches of which one of rotations of the pair of driven gears is transmitted to the propeller shaft. This can switch the rotation direction of a pusher propeller (that is, whether to move forward or move rearward).

There has been provided an outboard motor with regular rotation specification (hereinafter referred to as an "R/R specification") and an outboard motor with a counter rotation specification (hereinafter referred to as a "C/R specification"). The outboard motor with R/R specification moves forward when a pusher propeller rotates to the right viewed from rearward and moves rearward when the pusher propeller rotates to the left. In contrast to this, the outboard motor with C/R specification moves forward when a pusher propeller rotates to the left viewed from rearward and moves rearward when the pusher propeller rotates to the right. Thus, a relationship between the travelling direction of the outboard motor and the rotation direction of the pusher propeller is the opposite between the outboard motor with R/R specification and the outboard motor with C/R specification. Accordingly, in the case where the R/R specification and the C/R specification share a shift mechanism, a relationship between a transmission of a rotative power to a propeller shaft through which one of a pair of driven gears and the front and rear movements of the outboard motor becomes the opposite between the R/R specification and the C/R specification. For example, generally, the pair of driven gears are arranged in a front-rear direction across a driving gear. With the R/R specification, the outboard motor moves forward when the rotative power is transmitted to the propeller shaft via the driven gear positioned on a front side. Accordingly, an application of the shared shift mechanism to the outboard motor with C/R specification moves the outboard motor forward when the rotative power is transmitted to the propeller shaft via the driven gear positioned on the rear side.

Generally, the outboard motor takes time for forward movement longer than the rearward movement and a load applied to the driven gear is also large. The increase in load applied to the driven gear displaces the driven gear and changes an abutment of teeth with the driving gear; therefore, service lives of the driving gear and the driven gear are likely to be short. Therefore, to share the shift mechanism between the R/R specification and the C/R specification, it is preferable that the driven gear positioned on the rear side (the driven gear that transmits the rotative power during the forward movement in the C/R specification) also has a configuration with which the displacement can be restrained in the case of the application of a large load. Japanese Laid-open Patent Publication No. 2012-187967 (hereinafter referred to as Patent Document 1) discloses a configuration applicable to both the specifications, R/R specification and C/R specification, to restrain a displacement of a gear. Japanese Laid-open Patent Publication No. 2013-107604 (hereinafter referred to as Patent Document 2) discloses a configuration for appropriate abutment of teeth between a driving gear and a driven gear even if a large load is applied to the driven gear. However, with the configuration described in Patent Document 1, since a thrust applied to a propeller shaft is transmitted to the driven gear. This varies a behavior of the driven gear according to the thrust applied to the propeller shaft, making the behavior unstable.

As a roller bearing (a bearing) to support the driven gear positioned on the rear side, a conical roller bearing (a conical bearing), which can bear a large load compared with a ball roller bearing (a ball bearing), is possibly applied. As a supporting structure for the conical roller bearing, for example, a differential gear mechanism for a four-wheeled vehicle possibly employs a configuration that includes an elastic body between two conical roller bearings arranged in directions opposite from one another. This configuration ensures stabilizing a preload applied to the two conical roller bearings and restraining a looseness of nuts securing the conical roller bearings. However, due to securement of an arrangement space and a restriction on attachment, the application of this configuration to the outboard motor is difficult.

SUMMARY OF THE INVENTION

Considering the circumstances, an object to be solved by the present invention is to, in a supporting structure for a gear of an outboard motor, stabilize a preload applied to a conical roller bearing and restrain a looseness of a nut securing the conical roller bearing while space saving is achieved.

To solve the problem, the present invention includes a first driven gear, a second driven gear, a first conical roller bearing and a second conical roller bearing, a compressible and deformable biasing member, a spacer, and a supporting member. The first driven gear is disposed in front of a driving gear to mesh with the driving gear. The driving gear rotates through transmission of a rotative power from a driving power source. The second driven gear has a tubular portion concentrically to a rotational center line. The second driven gear is disposed at a rear of the driving gear to mesh with the driving gear. The first conical roller bearing and the second conical roller bearing are disposed on an outer periphery of the tubular portion of the second driven gear in directions opposite from one another. The biasing member is disposed one of between inner races and between outer races of the first conical roller bearing and the second conical roller bearing. The biasing member biases the one of the inner races and the outer races in directions separate from one another. The spacer is disposed between the other inner races or outer races of the first conical roller bearing and the second conical roller bearing to maintain a distance between the other ones. The supporting member is disposed displaceable in an axial direction of the tubular portion. The supporting member is locked to the other inner race or outer race of the second conical roller bearing to hold the first conical roller bearing and the second conical roller bearing to the tubular portion of the second driven gear. The one of the inner races and the outer races of the first conical roller bearing and the second conical roller bearing are relatively displaceable in an axial direction.

The following configuration may be employed. The first conical roller bearing and the second conical roller bearing are disposed in directions opposed to one another at sides where apexes of orbit planes of the outer races and the inner races of the first conical roller bearing and the second conical roller bearing are positioned. The biasing member is disposed between the inner races of the first conical roller bearing and the second conical roller bearing. The spacer is disposed between the outer races of the first conical roller bearing and the second conical roller bearing.

DETAILED DESCRIPTION OF THE PREFERRED EMBODIMENTS

The following describes details of embodiments of the present invention with reference to the drawings. Each drawing appropriately indicates a front side (a forward movement direction) of an outboard motor by an arrow Fr, a rear side (a rearward movement direction) by an arrow Rr, a right side by an arrow R, a left side by an arrow L, an upper side by an arrow Up, and a lower side by an arrow Dn. For convenience of explanation, regarding orientations of respective conical roller bearings applied to the outboard motor in an axial direction (a direction of a rotational center line), a side where an apex of an orbit plane of an inner race and an apex of an orbit plane of an outer race are positioned is referred to as an "apex side," and the opposite side is referred to as a "non-apex side."

<Entire Configuration of Outboard Motor>

Figure 1:
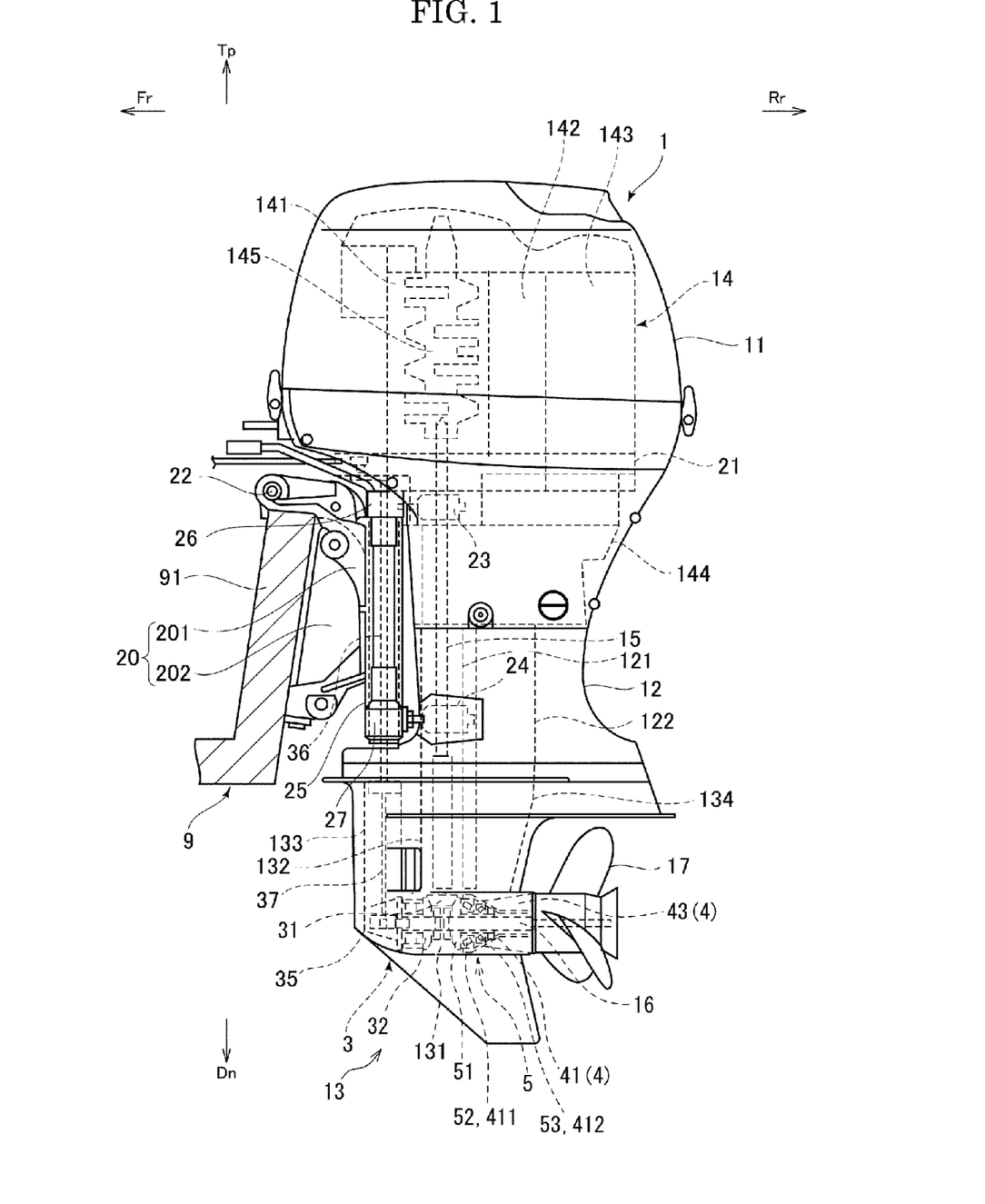
FIG. 1 is a left side view schematically illustrating an exemplary configuration of an outboard motor according to an embodiment.

First, the following describes the entire configuration of an outboard motor 1 to which a supporting structure for a gear according to the embodiments of the present invention is applied with reference to FIG. 1. FIG. 1 is a left side view schematically illustrating an exemplary configuration of the outboard motor 1. As illustrated in FIG. 1, the outboard motor 1 is mounted to a rear plate 91 of a ship 9 for use.

The outboard motor 1 includes an engine housing 11, which is disposed on the uppermost portion, a drive shaft housing 12, which is disposed below the engine housing 11, and a gear housing 13, which is disposed below the drive shaft housing 12. The engine housing 11, the drive shaft housing 12, and the gear housing 13 are chassis of the outboard motor 1 and constitute an external design of the outboard motor 1. The engine housing 11 and the drive shaft housing 12 are, for example, made of a resin material and are formed by injection molding or a similar method. The gear housing 13 is, for example, made of a metallic material such as an aluminum alloy and is formed by casting (for example, die casting) or a similar method. A bracket device 20 is disposed on a front side of the chassis (specifically, the engine housing 11 and the drive shaft housing 12) of the outboard motor 1. The bracket device 20 is to mount the outboard motor 1 to the ship 9. A pusher propeller 17 is disposed at a rear side of the gear housing 13. Furthermore, the gear housing 13 internally includes a shift mechanism chamber 131. This shift mechanism chamber 131 houses a shift mechanism 3. The supporting structure for the gear according to the embodiment of the present invention is applied to a supporting structure for a second driven gear 51 of the shift mechanism 3.

The engine housing 11 internally houses an engine unit 14, which is a driving power source for the outboard motor 1. An engine holder 21 supports the engine unit 14. For example, a vertical water-cooled engine (an internal combustion engine) is applied to the engine unit 14. In this case, the engine unit 14 is configured of a cylinder head 143, a cylinder block 142, a crankcase 141, an oil pan 144, and a similar member. In the engine unit 14, the crankcase 141 is positioned on the frontmost, the cylinder block 142 is positioned at the rear of the crankcase 141, the cylinder head 143 is positioned at the rear of the cylinder block 142, and the oil pan 144 is positioned below the crankcase 141, the cylinder block 142, and the cylinder head 143. The engine unit 14 is disposed in a direction where an axis line (a rotational center line) of a crankshaft 145, an output shaft of a rotative power, becomes parallel to a vertical direction. The engine housing 11 internally houses almost the entire engine holder 21, which is a member supporting the engine unit 14, and a part of the engine holder 21 close to the front is exposed to the outside of the engine housing 11. The crankcase 141, the cylinder block 142, and the cylinder head 143 of the engine unit 14 are disposed above the engine holder 21 while the oil pan 144 is disposed below the engine holder 21.

An upper drive shaft chamber 121 and an upper exhaust passage 122 are disposed inside the drive shaft housing 12. The upper drive shaft chamber 121 is a region extending in the vertical direction. The upper drive shaft chamber 121 internally houses a part close to an upper side of a drive shaft 15 to be rotatable in a direction where the axis line (the rotational center line) becomes parallel to the vertical direction. An upper end portion of the drive shaft 15 is coupled to the crankshaft 145 of the engine unit 14 such that the drive shaft 15 can receive a transmitted rotative power. A part close to the lower side of the drive shaft 15 enters into the gear housing 13. The drive shaft 15 transmits the rotative power output from the engine unit 14, the driving power source, to a propeller shaft 16 via the shift mechanism 3, which will be described later.

The upper exhaust passage 122 is disposed at the rear of the upper drive shaft chamber 121. The upper exhaust passage 122 forms a part of an exhaust passage to discharge the exhaust air from the engine unit 14 to the outside of the outboard motor 1. The upper end of the upper exhaust passage 122 is coupled to an exhaust port on the engine unit 14. The lower end of the upper exhaust passage 122 is open. With the gear housing 13 mounted to the drive shaft housing 12, the upper exhaust passage 122 couples to a lower exhaust passage 134 (described later), which is disposed inside the gear housing 13.

The bracket device 20 includes a swivel bracket 201 and a transom bracket 202. The swivel bracket 201 is coupled to the front sides of the engine housing 11 and the drive shaft housing 12, which are the chassis of the outboard motor 1, via a pilot shaft 25, which extends in the vertical direction, so as to be rotatable in the horizontal direction (swingable in the lateral direction). The upper end portion and the lower end portion of the pilot shaft 25 are secured to the front side of the chassis of the outboard motor 1 via an upper mounting bracket 26 and a lower mounting bracket 27, respectively. A steering bracket is disposed at the upper mounting bracket 26. The steering bracket is coupled to a steering wheel (not illustrated) with a cable (not illustrated) or a similar member. A ship operator (such as a user) or a similar person steers the steering wheel to ensure steering the chassis of the outboard motor 1 around the pilot shaft 25 in the lateral direction with respect to the bracket device 20.

The transom bracket 202 and the swivel bracket 201 are coupled so as to be relatively rotatable (swingable) in the vertical direction (a pitching direction) via a tilt shaft 22, which extends in the lateral direction. Specifically, the tilt shaft 22 is supported to the swivel bracket 201 in a direction that the axis line of the tilt shaft 22 extends in the lateral direction. The transom bracket 202 rotatably supports the tilt shaft 22. This allows the chassis of the outboard motor 1 to be tilted and trimmed in the vertical direction around the tilt shaft 22. The outboard motor 1 includes a trim-up control device and a trim-down control device (not illustrated). These trim-up control device and trim-down control device tilt and trim the outboard motor 1 with hydraulic pressure according to an operation by the ship operator or a similar person.

A right and left pair of upper mounting units 23 are disposed at the front portion of the engine holder 21. The engine holder 21 and the upper mounting bracket 26 are combined via the right and left pair of upper mounting units 23. A pair of lower mounting units 24 are disposed at both side portions of the drive shaft housing 12. The drive shaft housing 12 and the lower mounting bracket 27 are coupled via the pair of lower mounting units 24.

An upper shift rod 36 is rotatably inserted through the pilot shaft 25. The upper shift rod 36 is a member that switches a shift position of the shift mechanism 3, which will be described later. The upper end portion of the upper shift rod 36 is coupled to an actuator (not illustrated) to be rotated by a driving power from the actuator. The lower end portion of the upper shift rod 36 is coupled to a lower shift rod 37 (described later) housed in the gear housing 13 to ensure transmitting the rotation to the lower shift rod 37.

Configurations of the respective members and respective devices are not especially limited. The known various configurations are applicable to these respective members and respective devices.

<Gear Housing>

Figure 2:
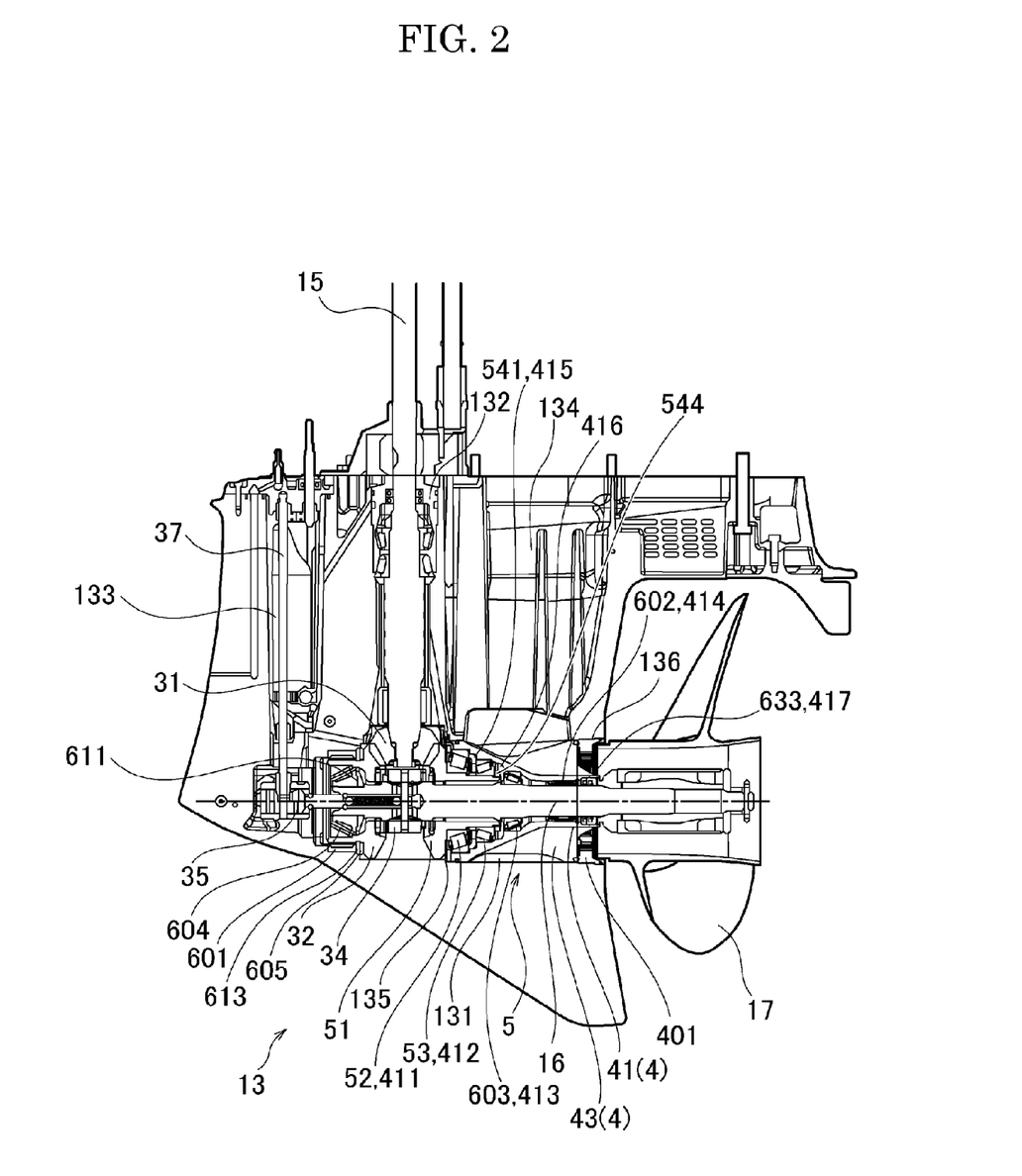
FIG. 2 is a cross-sectional view schematically illustrating an exemplary configuration of a gear housing.

The following describes an exemplary configuration of the gear housing 13 with reference to FIG. 2. FIG. 2 is a cross-sectional view schematically illustrating the exemplary configuration of the gear housing 13. As illustrated in FIG. 2, the gear housing 13 is disposed below the drive shaft housing 12, that is, the lowest portion of the outboard motor 1. The gear housing 13 internally includes a shift mechanism chamber 131, a lower drive shaft chamber 132, a shift rod chamber 133, and the lower exhaust passage 134. The pusher propeller 17 is disposed at the rear of the gear housing 13.

The shift mechanism chamber 131 is an opening whose rear side is open and front side is closed. The shift mechanism chamber 131 internally houses a part of the propeller shaft 16 close to the front and the shift mechanism 3. The shift mechanism chamber 131 forms a part of an exhaust passage to discharge the exhaust air from the engine unit 14, the internal combustion engine, to the outside. The shift mechanism 3 intermits the rotative power between the drive shaft 15 and the propeller shaft 16 and switches the rotation direction of the transmitted rotative power. The propeller shaft 16 is rotatably supported to the gear housing 13 in a direction that the axis line (the rotational center line) of the propeller shaft 16 becomes parallel to the front-rear direction. The rear portion of the propeller shaft 16 projects outside the shift mechanism chamber 131. The pusher propeller 17 is mounted to this projecting part.

The lower drive shaft chamber 132 is a region extending in the vertical direction. The upper end of the lower drive shaft chamber 132 is open. With the gear housing 13 mounted to the lower side of the drive shaft housing 12, the lower drive shaft chamber 132 is coupled to the upper drive shaft chamber 121, which is disposed in the drive shaft housing 12. The lower end of the lower drive shaft chamber 132 is coupled to the shift mechanism chamber 131. The lower drive shaft chamber 132 rotatably houses a part close to the lower side including the lower end portion of the drive shaft 15 and also includes a roller bearing (a bearing), which rotatably supports the drive shaft 15, and a similar member.

The shift rod chamber 133 is disposed in front of the lower drive shaft chamber 132. The shift rod chamber 133 is a region extending in the vertical direction. The upper end of the shift rod chamber 133 is open and is covered with a lid member or a similar member. The lower end of the shift rod chamber 133 is coupled to the front end portion of the shift mechanism chamber 131. The shift rod chamber 133 internally houses the rotatable lower shift rod 37. The upper end portion of the lower shift rod 37 is coupled to the lower end portion of the upper shift rod 36. Through the transmission of rotation from the upper shift rod 36, the lower shift rod 37 rotates.

The lower exhaust passage 134 is disposed at the rear of the lower drive shaft chamber 132. The upper end of the lower exhaust passage 134 is open. With the gear housing 13 mounted to the drive shaft housing 12, the lower exhaust passage 134 is coupled to the upper exhaust passage 122, which is disposed in the drive shaft housing 12. The lower end of the lower exhaust passage 134 is coupled to the shift mechanism chamber 131, which is the opening. The exhaust air from the engine unit 14 is discharged to the outside of the outboard motor 1 through the upper exhaust passage 122, which is disposed in the drive shaft housing 12, the lower exhaust passage 134, which is disposed in the gear housing 13, the shift mechanism chamber 131, and the exhaust passage disposed at the pusher propeller 17. Thus, the shift mechanism chamber 131, which is disposed at the chassis (the gear housing 13) of the outboard motor 1, is the opening open at the rear side. A part of the shift mechanism chamber 131 close to the rear forms a part of the exhaust passage from the exhaust port of the engine unit 14 to the outside of the chassis of the outboard motor 1.

<Shift Mechanism>

The following describes an exemplary configuration of the shift mechanism 3. The shift mechanism 3 intermits the rotative power transmitted from the drive shaft 15 to the propeller shaft 16 and switches the rotation direction of the transmitted rotative power. Since the axis line of the drive shaft 15 is parallel to the vertical direction and the axis line of the propeller shaft 16 is parallel to the front-rear direction, the axial direction of the transmitted rotative power (the direction of the rotational center line) is changed by 90° at the shift mechanism 3.

The shift mechanism 3 includes a driving gear 31, a first driven gear 32, the second driven gear 51, a dog 34, which is disposed at the propeller shaft 16, and a dog driving mechanism 35. A bevel gear is applied to all the driving gear 31, the first driven gear 32, and the second driven gear 51. The driving gear 31 is disposed at the lower end portion of the drive shaft 15 and rotates integrally with the drive shaft 15. The first driven gear 32 and the second driven gear 51 are disposed at an outer periphery of the propeller shaft 16 to be relatively rotatable with respect to the propeller shaft 16. In other words, the first driven gear 32 and the second driven gear 51 are arranged concentrically to one another in the front-rear direction. The propeller shaft 16 is relatively and rotatably inserted through through-holes, which are disposed on the first driven gear 32 and the second driven gear 51, concentrically. The first driven yea 32 is positioned at the lower front side of the driving gear 31 and in front of the second driven gear 51 and always meshes with the driving gear 31. The second driven gear 51 is positioned at the lower rear side of the driving gear 31 and at the rear of the first driven gear 32 and always meshes with the driving gear 31. When the rotative power from the engine unit 14, the driving power source, is transmitted to the driving gear 31 to rotate the driving gear 31, the rotative power is transmitted from the driving gear 31 to the first driven gear 32 and the second driven gear 51, thus the first driven gear 32 and the second driven gear 51 rotate in directions opposite from one another.

The first driven gear 32 includes a main body 321 and a tubular portion 322 and has a through-hole penetrating in the axis line (the rotational center line) direction. The main body 321 is a part that includes teeth. The tubular portion 322 is a cylindrically-shaped part projecting toward a side opposite from a side where the teeth are disposed from the main body 321 (a side where the teeth mesh with the driving gear 31). In a direction that the main body 321 is positioned at the rear and the tubular portion 322 is positioned at the front, the first driven gear 32 is disposed in front of the driving gear 31 inside the shift mechanism chamber 131. A first radial bearing 601 is disposed between the outer peripheral surface of the tubular portion 322 of the first driven gear 32 and the inner peripheral surface of the shift mechanism chamber 131. A thrust bearing 605 and a fifth spacer 613, which is an annular-shaped member, are disposed between the end surface on the front side of the main body 321 of the first driven gear 32 and the inner peripheral surface of the shift mechanism chamber 131 in the gear housing 13. The first driven gear 32 is rotatably supported to the gear housing 13 by the first radial bearing 601 and the thrust bearing 605. With this configuration, the first radial bearing 601 receives a radial load applied to the first driven gear 32 and the thrust bearing 605 receives a thrust load. The configurations of the first radial bearing 601 and the thrust bearing 605 are not specifically limited. For example, the known various radial roller bearings and thrust roller bearings such as a roller bearing and a needle bearing are applicable to the first radial bearing 601 and the thrust bearing 605.

Similar to the first driven gear 32, the second driven gear 51 also includes a main body 511 and a tubular portion 513 and has a through-hole penetrating in the axis line (the rotational center line) direction. The main body 511 of the second driven gear 51 is a part that includes teeth. The tubular portion 513 of the second driven gear 51 is a cylindrically-shaped part projecting toward a side opposite from a side where the teeth are disposed from the main body 511 (a side where the teeth mesh with the driving gear 31) and is disposed concentrically with the main body 511. In a direction that the main body 511 is positioned at the front and the tubular portion 513 is positioned at the rear, the second driven gear 51 is disposed at the rear of the driving gear 31 inside the shift mechanism chamber 131. The second driven gear 51 is rotatably supported to the inside of the shift mechanism chamber 131 in the gear housing 13 with the first conical roller bearing 52 and the second conical roller bearing 53 via a bearing housing 4 (described later). Details of the supporting structure for the second driven gear 51 will be described later.

The propeller shaft 16 is concentrically inserted through the through-holes disposed on the first driven gear 32 and the second driven gear 51 and is relatively rotatable with respect to the first driven gear 32 and the second driven gear 51. The front end portion of the propeller shaft 16 enters into the inner peripheral side of the tubular portion 322 of the first driven gear 32. The propeller shaft 16 is rotatably supported to a fourth conical roller bearing 604, which is disposed on the inner peripheral side of the tubular portion 322 of the first driven gear 32. A first lock portion 161 is disposed at a part near the front end portion of the propeller shaft 16 and at the rear side part of the propeller shaft 16 inserted into the fourth conical roller bearing 604. The first lock portion 161 with rib shape projects radially outside and circumferentially extends. An annular-shaped third spacer 611 is interposed between the first lock portion 161 and an inner race of the fourth conical roller bearing 604. In view of this, a forward thrust load applied to the propeller shaft 16 is transmitted to the fourth conical roller bearing 604 via the first lock portion 161 and the third spacer 611 and further is received by the thrust bearing 605 via the first driven gear 32.

An intermediate portion of the propeller shaft 16 in the front-rear direction is inserted through the bearing housing 4 (described later). A third conical roller bearing 603 and a second radial bearing 602, which are disposed on the inner peripheral side of the bearing housing 4, rotatably support the intermediate portion. A second lock portion 162 is disposed at a part on the front side of a part of the propeller shaft 16 inserted into the third conical roller bearing 603. Similar to the first lock portion 161, the second lock portion 162 with rib shape projects radially outside and circumferentially extends. An annular-shaped fourth spacer 612 is interposed between the second lock portion 162 and an inner race of the third conical roller bearing 603. In view of this, the third conical roller bearing 603 receives a rearward thrust load applied to the propeller shaft 16 via the second lock portion 162 and the fourth spacer 612.

The third conical roller bearing 603, the fourth conical roller bearing 604, and the second radial bearing 602 receive the radial load applied to the propeller shaft 16. Thus, the propeller shaft 16 is rotatably supported to the inside of the shift mechanism chamber 131 by the third conical roller bearing 603, the fourth conical roller bearing 604, and the second radial bearing 602. The outer diameter of the third conical roller bearing 603 is smaller than all outer diameters of a first conical roller bearing 52 and a second conical roller bearing 53. Furthermore, the outer diameter of the second radial bearing 602 is smaller than the outer diameter of the third conical roller bearing 603. The configurations of the third conical roller bearing 603, the fourth conical roller bearing 604, and the second radial bearing 602 are not specifically limited. The known various conical roller bearings are applicable to the third conical roller bearing 603 and the fourth conical roller bearing 604. The known various radial roller bearings such as the needle bearing and the roller bearing are applicable to the second radial bearing 602.

Figure 3:
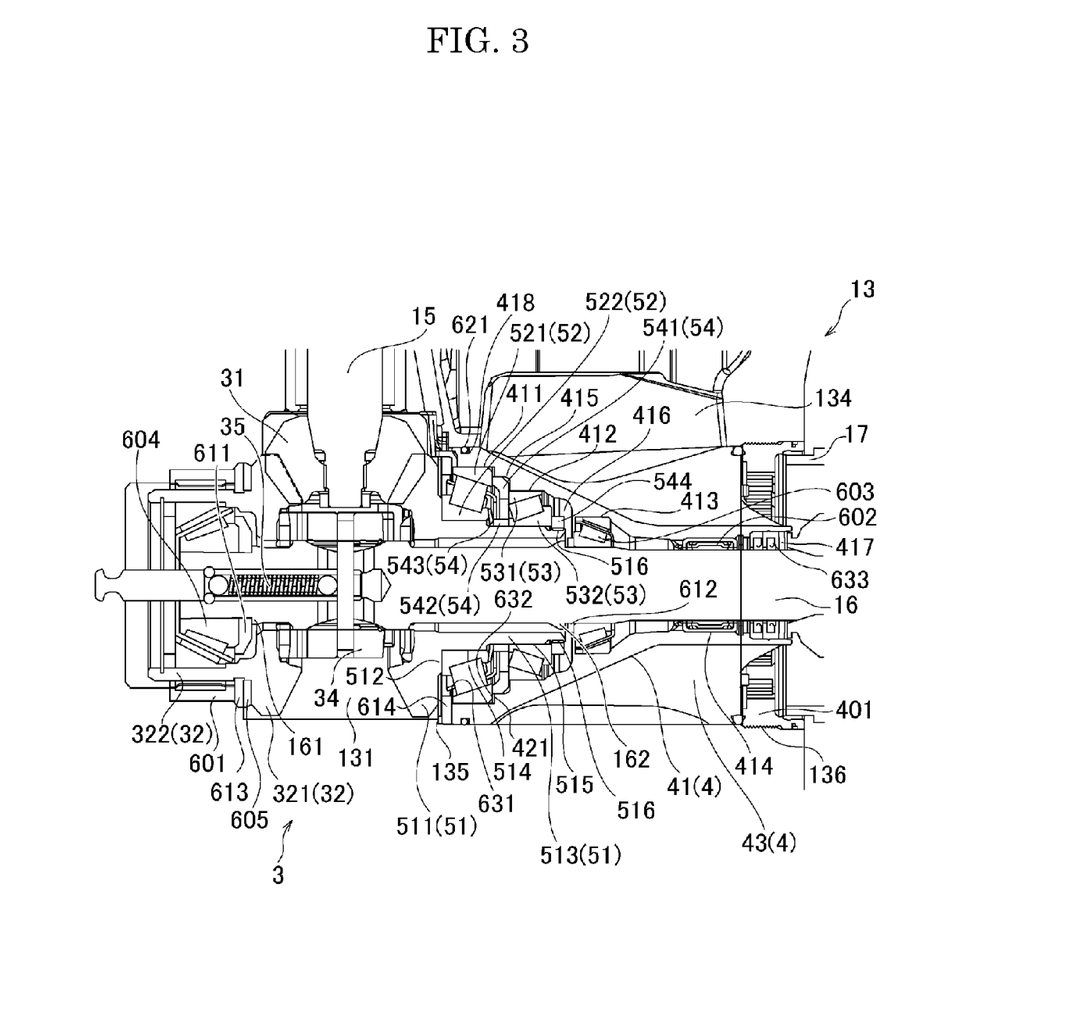
FIG. 3 is a cross-sectional view schematically illustrating a supporting structure for a driven gear.

As illustrated in FIG. 3, the propeller shaft 16 is movably and concentrically inserted into the through-hole disposed on the second driven gear 51. The propeller shaft 16 does not directly engage the second driven gear 51.

The dog 34 is disposed at the outer periphery of the propeller shaft 16 and between the first driven gear 32 and the second driven gear 51. The dog 34 rotates integrally with the propeller shaft 16 and can reciprocate in a sliding manner with respect to the propeller shaft 16 in the axial direction. When the dog 34 moves forward and engages the first driven gear 32, the first driven gear 32 rotates integrally with the propeller shaft 16. With this state, the rotative power output from the engine unit 14 is transmitted to the propeller shaft 16 via the driving gear 31, the first driven gear 32, and the dog 34. When the dog 34 moves rearward and engages the second driven gear 51, the second driven gear 51 rotates integrally with the propeller shaft 16. With this state, the rotative power output from the engine unit 14 is transmitted to the propeller shaft 16 via the driving gear 31, the second driven gear 51, and the dog 34. In a state where the dog 34 is positioned in the middle of the first driven gear 32 and the second driven gear 51 and engages neither the first driven gear 32 nor the second driven gear 51, the rotative power output from the engine unit 14 is not transmitted to the propeller shaft 16.

In this embodiment, the drive shaft 15 rotates to the right (rotates clockwise) in top view by the rotative power output from the engine unit 14. In this case, viewing the outboard motor 1 from rearward, the first driven gear 32 rotates to the right (rotates clockwise) while the second driven gear 51 rotates to the left (rotates counterclockwise). With the outboard motor 1 with R/R specification, the pusher propeller 17 is mounted to the propeller shaft 16. The pusher propeller 17 rotates rightward, viewing the outboard motor 1 from rearward, to generate a thrust to move the outboard motor 1 forward. In view of this, with the outboard motor 1 with R/R specification, in the shift position of the shift mechanism 3, a state to transmit the rotative power via the first driven gear 32 is "forward movement" and a state to transmit the rotative power via the second driven gear 51 is "rearward movement." On the other hand, with the outboard motor 1 with C/R specification, the pusher propeller 17 is mounted to the propeller shaft 16. The pusher propeller 17 rotates leftward, viewing the outboard motor 1 from rearward, to generate a thrust to move the outboard motor 1 forward. In view of this, with the outboard motor 1 with C/R specification, in the shift position of the shift mechanism 3, a state to transmit the rotative power via the second driven gear 51 is "forward movement" and a state to transmit the rotative power via the first driven gear 32 is "rearward movement."

That is, in the shift position of the shift mechanism 3 with the outboard motor 1 with R/R specification, the state where the dog 34 moves forward to engage the first driven gear 32 is the "forward movement" while the state where the dog 34 moves rearward to engage the second driven gear 51 is the "rearward movement." On the other hand, with the outboard motor 1 with C/R specification, the state where the dog 34 moves rearward to engage the second driven gear 51 is the "forward movement" while the state where the dog 34 moves forward to engage the first driven gear 32 is the "rearward movement." Thus, this embodiment can apply the one type shift mechanism 3 to both the outboard motor 1 with R/R specification and the outboard motor 1 with C/R specification. It is unnecessary to change the configuration of the shift mechanism 3 between the R/R specification and the C/R specification. With the outboard motor 1 with C/R specification, the first driven gear 32 transmits the rotative power to move the outboard motor 1 forward to the propeller shaft 16.

Through the rotations of the upper shift rod 36 and the lower shift rod 37, the dog driving mechanism 35 slidably moves the dog 34 back and forth in the front-rear direction. For example, the dog driving mechanism 35 includes a coupling rod, a cam, and a pin. The coupling rod is reciprocatably housed in the axial direction inside the propeller shaft 16. The cam converts the rotation of the lower shift rod 37 into a linear motion of the coupling rod. The pin joins the coupling rod and the dog 34 together. The ship operator or a similar person drives the actuator to rotate the upper shift rod 36 and the lower shift rod 37, ensuring switching the shift position of the shift mechanism 3. The configuration of the dog driving mechanism 35 is not especially limited, and various configurations are applicable.

<Supporting Structure for Second Driven Gear>

Figure 4:
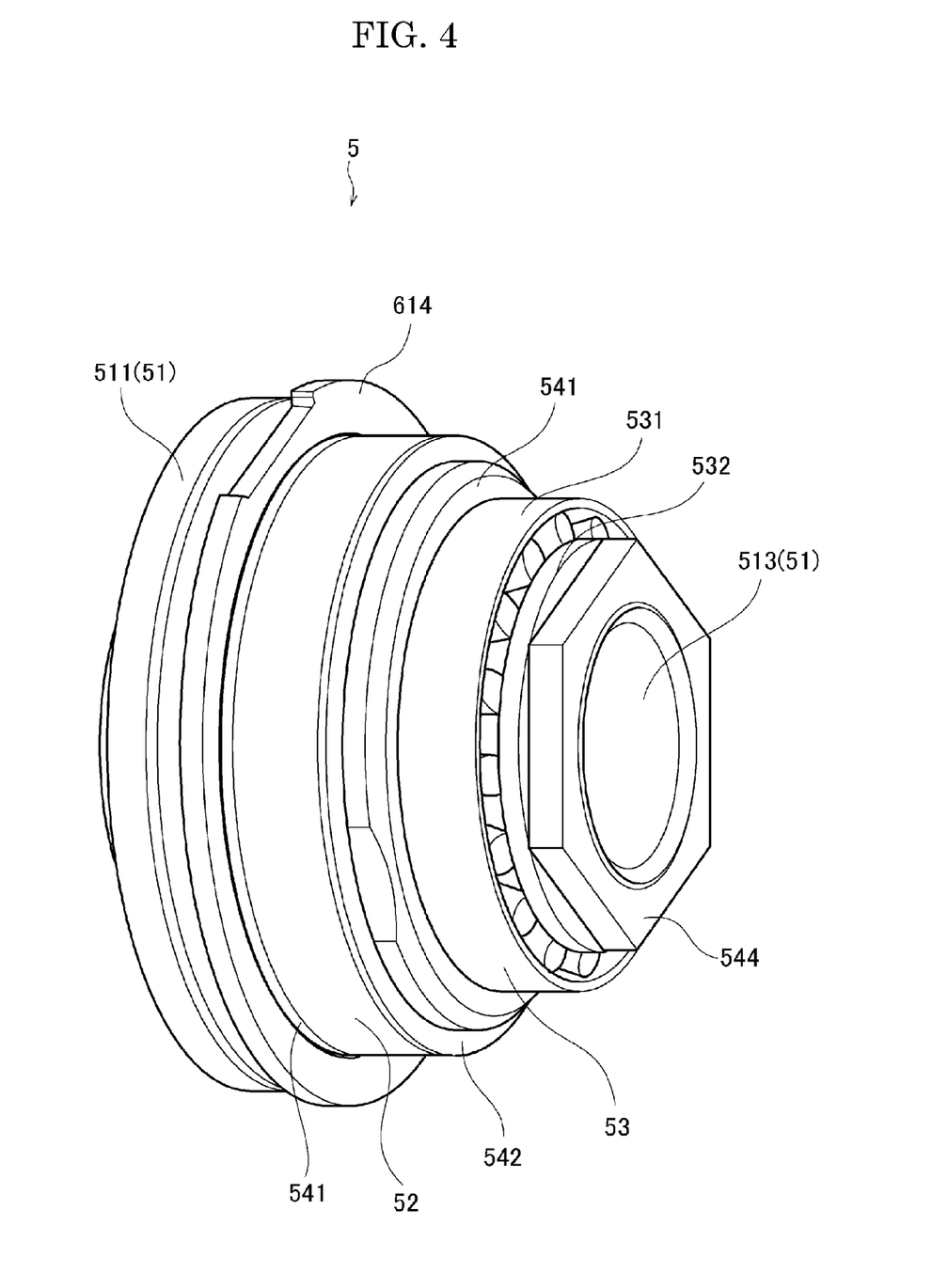
FIG. 4 is a perspective view schematically illustrating an exemplary configuration of a gear/bearing module.

The following describes an example of the supporting structure for the second driven gear 51, the supporting structure for gear according to the embodiment of the present invention, with reference to FIG. 3 and FIG. 4. FIG. 3 is a cross-sectional view schematically illustrating the exemplary configuration of the supporting structure for the second driven gear 51. FIG. 4 is a perspective view schematically illustrating the exemplary configuration of a gear/bearing module 5. As illustrated in FIG. 3, the shift mechanism chamber 131 in the gear housing 13 houses the bearing housing 4, a member separate from the gear housing 13. The second driven gear 51 is rotatably supported to the bearing housing 4 and the gear housing 13 by the first conical roller bearing 52 and the second conical roller bearing 53, which are arranged on the inner peripheral side of the bearing housing 4. As illustrated in FIG. 4, the second driven gear 51, the first conical roller bearing 52 and the second conical roller bearing 53, which rotatably support the second driven gear 51, and a preload mechanism 54 that applies a preload to the first conical roller bearing 52 and the second conical roller bearing 53 are modularized. For convenience of explanation, this module is referred to as a "gear/bearing module." The bearing housing 4 houses the gear/bearing module 5. The shift mechanism chamber 131 in the gear housing 13 houses the bearing housing 4 housing the gear/bearing module 5.

<Gear/Bearing Module>

The gear/bearing module 5 includes the second driven gear 51, the first conical roller bearing 52, the second conical roller bearing 53, and the preload mechanism 54, which applies the preload to the first conical roller bearing 52 and the second conical roller bearing 53. The preload mechanism 54 includes a biasing member 543, a first spacer 541, a second spacer 542, and a nut 544. Besides, the gear/bearing module 5 includes a first shim 631 and a second shim 632 to adjust an abutment of teeth between the driving gear 31 and the second driven gear 51 and to restrain a displacement of the second driven gear 51. The gear/bearing module 5 further includes a sixth spacer 614.

An abutting portion 512 is disposed on a surface on a rear side of the main body 511 of the second driven gear 51 (a surface on a side where the tubular portion 513 projects). An end surface on the non-apex side of an inner race 522 of the first conical roller bearing 52 contacts the abutting portion 512. The abutting portion 512 of the second driven gear 51 is a part projecting rearward with respect to another part (specifically, a part radially outside with respect to the abutting portion 512) and is disposed to surround the tubular portion 513. A projection dimension of the abutting portion 512 is not especially limited. In a state where the end surface on the non-apex side of an outer race 521 of the first conical roller bearing 52 contacts the abutting surface, it is only necessary for the projection dimension of the abutting portion 512 of the second driven gear 51 to be a dimension with which a part radially outside with respect to the abutting portion 512 does not contact a bearing retainer and the outer race 521 of the first conical roller bearing 52 and a similar member. Depending on the configuration applied to the first conical roller bearing 52, the abutting portion 512 may not project.

The tubular portion 513 of the second driven gear 51 has a cylindrical shape concentrically with the main body 511. An outer diameter of the tubular portion 513 of the second driven gear 51 is smaller than an outer diameter of the main body 511. A first bearing mounting portion 514 and a second bearing mounting portion 515 are disposed on an outer peripheral surface of the tubular portion 513 of the second driven gear 51 in an order from a side close to the main body 511 (a side where the main body 511 meshes with the driving gear 31). Furthermore, a male thread portion 516 is disposed at a rear end portion on the outer peripheral surface of the tubular portion 513 of the second driven gear 51. With the male thread portion 516, the nut 544, a supporting member (described later), can be fastened. The first bearing mounting portion 514 is a part to which the first conical roller bearing 52 is mounted and is a part with which the inner peripheral surface on the inner race 522 of the first conical roller bearing 52 is in contact. The second bearing mounting portion 515 is a part to which the biasing member 543, the second spacer 542, and the second conical roller bearing 53 are mounted and is a part with which the inner peripheral surface on the inner race 532 of the second conical roller bearing 53 is in contact. The male thread portion 516 is a part at which a male thread is disposed and is a part to which the nut 544, the supporting member, is fastened. The male thread portion 516 has some extent of length (described later) in the axial direction such that the fastened nut 544 is displaceable on the outer periphery of the tubular portion 513 in the axial direction.

The outer diameter of the first bearing mounting portion 514 and the outer diameter of the second bearing mounting portion 515 are each configured according to an inner diameter of the first conical roller bearing 52 and an inner diameter of the second conical roller bearing 53. With the inner diameter of the first conical roller bearing 52 larger than the inner diameter of the second conical roller bearing 53, the outer diameter of the first bearing mounting portion 514 becomes larger than the outer diameter of the second bearing mounting portion 515. In view of this, in this case, the outer diameter of the tubular portion 513 of the second driven gear 51 decreases in phases from the side of the main body 511 (the front side) toward the side of the male thread portion 516 (the rear side).

The first conical roller bearing 52 and the second conical roller bearing 53 are mounted and arranged at a predetermined distance in the front-rear direction (the axial direction) on the outer periphery of the tubular portion 513 of the second driven gear 51. As illustrated in FIG. 2 and FIG. 3, the first conical roller bearing 52 is positioned on the side close to the driving gear 31 (the front side), and the second conical roller bearing 53 is positioned on the side far from the driving gear 31 (the rear side). The outer diameter of the first conical roller bearing 52 is larger than the outer diameter of the second conical roller bearing 53. However, it is only necessary that the inner diameter of the first conical roller bearing 52 is equal to or more than the inner diameter of the second conical roller bearing 53. This embodiment describes the example where the inner diameter of the first conical roller bearing 52 is larger than the inner diameter of the second conical roller bearing 53; however, the inner diameters may be identical. The first conical roller bearing 52 and the second conical roller bearing 53 are disposed in directions opposite from one another. In this embodiment, the first conical roller bearing 52 is disposed in a direction where the non-apex side is positioned on the side close to the side meshing with the driving gear 31 (the front side) and the apex side is positioned on the side far from the side meshing with the driving gear 31 (the rear side). The second conical roller bearing 53 is disposed in a direction where the apex side is positioned on the front side and the non-apex side is positioned on the rear side. Thus, in this embodiment, the first conical roller bearing 52 and the second conical roller bearing 53 are disposed in the directions opposite from one another such that their end surfaces on the apex sides are opposed. The specific configurations of the first conical roller bearing 52 and the second conical roller bearing 53 are not specifically limited. The conical roller bearings with the known various configurations are applicable to the first conical roller bearing 52 and the second conical roller bearing 53.

The biasing member 543 of the preload mechanism 54 is an annular-shaped member mountable to the outer periphery of the second bearing mounting portion 515 of the tubular portion 513 of the second driven gear 51. The biasing member 543 has a configuration elastically compressible and deformable in the axial direction (the front-rear direction). For example, various elastically compressible and deformable members such as a wave washer, a bend washer, and a disc spring are applicable to the biasing member 543.

The first spacer 541 of the preload mechanism 54 is a member having an annular shape and is a member separate from the bearing housing 4. The first spacer 541 is disposed between outer races 521 and 531 of the first conical roller bearing 52 and the second conical roller bearing 53 to hold a distance between them at a predetermined value. The inner diameter of the end surface on the front side of the first spacer 541 is larger than the inner diameter of the end surface on the rear side (the end surface on the apex side) of the outer race 521 of the first conical roller bearing 52 and smaller than the outer diameter. The inner diameter of the end surface on the rear side on of the first spacer 541 is larger than the inner diameter of the end surface on the front side (the end surface on the apex side) of the outer race 531 of the second conical roller bearing 53 and smaller than the outer diameter. The inner diameter of the first spacer 541 is configured to be a diameter with which the second spacer 542 and the biasing member 543 can be housed on the inner peripheral side. The outer diameter of the first spacer 541 is larger than the outer diameter of the outer race 531 of the second conical roller bearing 53 and smaller than the outer diameter of the outer race 521 of the first conical roller bearing 52. With the assembled gear/bearing module 5, the surface on the front side of the first spacer 541 contacts the end surface on the apex side of the outer race 521 of the first conical roller bearing 52, and the surface on the rear side contacts the end surface on the apex side of the outer race 531 of the second conical roller bearing 53. This holds a distance between the outer races 521 and 531 of the first conical roller bearing 52 and the second conical roller bearing 53 at a predetermined value. The dimension of the first spacer 541 in the axial direction, that is, the distance between the outer races 521 and 531 of the first conical roller bearing 52 and the second conical roller bearing 53 is not specifically limited and is configured appropriately.

The second spacer 542 of the preload mechanism 54 is a member having an annular shape and is a member separate from the bearing housing 4. The second spacer 542 is, together with the biasing member 543, disposed between the inner races 522 and 532 of the first conical roller bearing 52 and the second conical roller bearing 53. The second spacer 542 holds a distance between the inner races 522 and 532 of the first conical roller bearing 52 and the second conical roller bearing 53 at a predetermined value. It is only necessary that the inner diameter of the second spacer 542 is a diameter with which the second spacer 542 is mountable to the second bearing mounting portion 515 of the second driven gear 51 and is displaceable in the axial direction with the mounted state. It is only necessary that the outer diameter of the second spacer 542 is a diameter with which the second spacer 542 is insertable into the inner peripheral side of the first conical roller bearing 52 and does not inhibit the rotations of the first conical roller bearing 52 and the second conical roller bearing 53 (for example, a diameter with which the second spacer 542 does not contact a bearing retainer and a similar member).

The nut 544 of the preload mechanism 54 is a holding member to hold the first conical roller bearing 52, the second conical roller bearing 53, the biasing member 543, the first spacer 541, and the second spacer 542 to the outer periphery of the tubular portion 513 of the second driven gear 51. The nut 544 of the preload mechanism 54 can be fastened to the male thread portion 516 on the second driven gear 51 and is displaceable in the axial direction of the male thread portion 516. The outer diameter of the nut 544 is a diameter larger than the inner diameter of the inner race 532 of the second conical roller bearing 53 such that the nut 544 can be brought into abutment with the end surface on the non-apex side of the inner race 532 of the second conical roller bearing 53. The outer diameter of the nut 544 is preferably smaller than the outer diameter of the second conical roller bearing 53.

Both the first shim 631 and the second shim 632 are plate-shaped members having the annular shape. The first shim 631 has a dimension with which the first shim 631 can be stacked over the end surface on the non-apex side (the front side) of the outer race 521 of the first conical roller bearing 52. For example, the first shim 631 has a shape and a dimension identical to those of the end surface on the non-apex side (the front side) of the outer race 521 of the first conical roller bearing 52. The second shim 632 has a dimension with which the second shim 632 can be stacked over the end surface on the apex side (the rear side) of the outer race 521 of the first conical roller bearing 52 without an interference with the first spacer 541. For example, the inner diameter of the second shim 632 is equal to or more than the outer diameter of the first spacer 541 and the outer diameter is equal to or less than the inner diameter of a first bearing housing portion 411.

The sixth spacer 614 is a member to press down the first conical roller bearing 52 to avoid a displacement of the first conical roller bearing 52. The sixth spacer 614 has an annular shape. The outer diameter of the sixth spacer 614 is equal to or less than the outer diameter of the end surface on the front side of a main body 41 of the bearing housing 4, and the inner diameter is smaller than the outer diameter of the end surface on the non-apex side of the outer race 521 of the first conical roller bearing 52. The dimension of the sixth spacer 614 in the axial direction (namely, the thickness) is appropriately configured and is not specifically limited.

The following describes an attachment structure of the gear/bearing module 5.

First, the sixth spacer 614 is disposed at the rear of the main body 511 of the second driven gear 51 (the side to which the tubular portion 513 projects) and further the first shim 631 is disposed at the rear of the sixth spacer 614. With the sixth spacer 614 and the first shim 631 disposed, the first conical roller bearing 52 is mounted to the first bearing mounting portion 514 of the tubular portion 513 of the second driven gear 51. In this embodiment, the first conical roller bearing 52 is mounted in a direction where the end surface on the apex side is positioned on the rear side and the end surface on the non-apex side is positioned on the front side. In view of this, the end surface on the non-apex side of the inner race 522 of the first conical roller bearing 52 is opposed to the abutting portion 512 of the main body 511 of the second driven gear 51. Additionally, the inner peripheral surface of the inner race 522 contacts the outer peripheral surface of the first bearing mounting portion 514.

The biasing member 543 is mounted to the rear side of the inner race 522 of the first conical roller bearing 52 and further the second spacer 542 is mounted to the rear side of the biasing member 543. The first spacer 541 is mounted to the rear side of the outer race 521 of the first conical roller bearing 52. The second conical roller bearing 53 is mounted to the rear sides of the biasing member 543, the second spacer 542, and the first spacer 541. The second conical roller bearing 53 is mounted in a direction where the end surface on the apex side is positioned on the front side and the end surface on the non-apex side is positioned on the rear side. Furthermore, the nut 544 is fastened to the male thread portion 516 on the tubular portion 513 such that the nut 544 is positioned on the rear side of the second conical roller bearing 53.

Rotating the nut 544 to move forward pushes the inner race 532 of the second conical roller bearing 53 by the nut 544, moving the second conical roller bearing 53 forward. The outer race 531 of the second conical roller bearing 53 pushes the first spacer 541 forward, and further the first spacer 541 pushes the outer race 521 of the first conical roller bearing 52 forward. The end surface on the front side (the end surface on the non-apex side) of the inner race 522 of the first conical roller bearing 52 contacts the abutting portion 512 of the main body 511 of the second driven gear 51.

When the nut 544 pushes the second conical roller bearing 53 to move the second conical roller bearing 53 forward, the biasing member 543 is sandwiched between the inner race 522 of the first conical roller bearing 52 and the second spacer 542 and is elastically compressed and deformed. The dimensions of the first spacer 541 and the second spacer 542 in the front-rear direction are configured to be dimensions with which the biasing member 543 is sandwiched between the inner race 522 of the first conical roller bearing 52 and the second spacer 542 and is elastically compressed and deformed in a state where the end surfaces of the outer races 521 and 531 of the first conical roller bearing 52 and the second conical roller bearing 53 contact respective both end surfaces of the first spacer 541.

The male thread portion 516, which is disposed on the tubular portion 513 of the second driven gear 51, has a length with which the male thread portion 516 projects rearward with respect to the second conical roller bearing 53 to ensure fastening the nut 544 in a state where the first conical roller bearing 52, the second conical roller bearing 53, the first spacer 541, the biasing member 543, and the second spacer 542 are mounted to this tubular portion 513 and the biasing member 543 is not elastically compressed and deformed. Furthermore, the male thread portion 516 has a length with which the nut 544 can be moved forward such that the end surface on the front side of the inner race 522 of the first conical roller bearing 52 contacts the abutting portion 512, the end surface on the rear side of the inner race 522 of the first conical roller bearing 52 contacts the end surface on the front side of the first spacer 541, and the end surface on the rear side of the first spacer 541 contacts the end surface on the front side of the outer race 531 of the second conical roller bearing 53. Thus, the male thread portion 516, which is disposed on the tubular portion 513 of the second driven gear 51, has a length to some extent such that the fastened nut 544 is displaceable in the axial direction.

On the outer periphery of the tubular portion 513 of the second driven gear 51, the first conical roller bearing 52 is disposed close to the front side and the second conical roller bearing 53 is disposed close to the rear side. Between the outer races 521 and 531 of the first conical roller bearing 52 and the second conical roller bearing 53, the first spacer 541 is disposed so as to interpose to maintain a distance between the outer races 521 and 531 at a predetermined distance. Between the inner races 522 and 532 of the first conical roller bearing 52 and the second conical roller bearing 53, the biasing member 543 and the second spacer 542 are arranged in the front-rear direction. Fastening the nut 544 to the rear sides of the biasing member 543 and the second spacer 542 holds these members to the outer peripheral side of the tubular portion 513 of the second driven gear 51. That is, the biasing member 543 and the second spacer 542 are sandwiched between the abutting portion 512 of the main body 511 of the second driven gear 51 and the nut 544 in the front-rear direction. With the nut 544 fastened, a restoring force by the biasing member 543 biases the inner race 532 of the second conical roller bearing 53 toward the rear side, and the end surface on the rear side of the inner race 532 is maintained in a state of contacting the end surface on the front side of the nut 544.

This configuration ensures housing the preliminarily assembled gear/bearing module 5 in the bearing housing 4 and attaching the bearing housing 4 to the gear housing 13. To attach the first conical roller bearing 52, the second conical roller bearing 53, and the preload mechanism 54 to the second driven gear 51, this attachment is not affected by accuracy of attachment to the bearing housing 4 and the gear housing 13. Therefore, the accuracy of attachment to the gear/bearing module 5 can be improved. Furthermore, this configuration ensures achieving a reduction in the number of man-hours to assemble the outboard motor 1.

The adjustment of the fastening power by the nut 544 can adjust the preload applied to the first conical roller bearing 52 and the second conical roller bearing 53. With the configuration where the elastically compressible and deformable biasing member 543 is disposed between the first conical roller bearing 52 and the second conical roller bearing 53, the biasing member 543 biases the second conical roller bearing 53 to the nut 544 side (that is, the direction of smaller preload). In view of this, compared with the configuration without the biasing member 543, a change in preload with respect to the fastening power from the nut 544 becomes gradual, thereby easing the adjustment of preload. Since the biasing member 543 biases the inner race 532 of the second conical roller bearing 53 so as to push the second conical roller bearing 53 to the nut 544, this prevents or restrains the rotation of the nut 544. This ensures preventing or restraining the change in preload due to the rotation of the nut 544, especially, the reduction in preload due to a looseness of the nut 544.

With this configuration, the preload applied to the first conical roller bearing 52 and the second conical roller bearing 53 can be adjusted in a state where the gear/bearing module 5 is not attached to the outboard motor 1. This eases the adjustment of preload. Furthermore, only adjusting the fastening power by the one nut 544 can adjust the preloads of both the first conical roller bearing 52 and the second conical roller bearing 53. Accordingly, since the preload mechanism 54 can be downsized, the gear/bearing module 5 can be downsized. Accordingly, this ensures a space saving of the gear/bearing module 5 and the housing space of the bearing housing 4, that is, downsizing of the supporting structure for the second driven gear 51 and space saving of the housing space can be achieved.

The positions of the biasing member 543 and the second spacer 542 may be opposite. That is, the second spacer 542 may be positioned on the front side, and the biasing member 543 may be positioned on the rear side. The biasing member 543 may be sandwiched between the second spacer 542 and the inner race 532 of the second conical roller bearing 53. The second spacer 542 may not be disposed. In short, it is only necessary that the elastically compressible and deformable biasing member 543 is disposed in a state of elastically compressed and deformed between the inner races 522 and 532 of the first conical roller bearing 52 and the second conical roller bearing 53. This configuration biases the inner race 522 of the first conical roller bearing 52 and the inner race 532 of the second conical roller bearing 53 in a direction separate from one another by the biasing member 543. In view of this, the inner race 522 of the first conical roller bearing 52 is maintained in a state of contacting the abutting portion 512 and the inner race 532 of the second conical roller bearing 53 is maintained in a state of being brought into abutment with the nut 544.

Furthermore, the first conical roller bearing 52 and the second conical roller bearing 53 may be opposed to one another by the end surfaces on the non-apex sides. In this case, the end surface on the apex side of the outer race 521 of the first conical roller bearing 52 is positioned on the front side and is brought into abutment with the main body 511 of the second driven gear 51. The biasing member 543 and the first spacer 541 are interposed between the outer races 521 and 531 of the first conical roller bearing 52 and the second conical roller bearing 53. The biasing member 543 is biased in the direction of separating the outer races 521 and 531 of the first conical roller bearing 52 and the second conical roller bearing 53 from one another. On the other hand, the second spacer 542 is interposed between the inner races 522 and 532 of the first conical roller bearing 52 and the second conical roller bearing 53 to hold a distance between them at a predetermined value. Furthermore, the nut 544 is brought into abutment with the end surface on the rear side of the outer race 531 of the second conical roller bearing 53 (the end surface on the apex side) to apply the preload to the outer race 531 of the second conical roller bearing 53 toward the front side.

Thus, it is only necessary that the first conical roller bearing 52 and the second conical roller bearing 53 are disposed in directions opposite from one another. In this case, the elastically compressible and deformable biasing member 543 is disposed any one of between the outer races 521 and 531 and between the inner races 522 and 532 of the first conical roller bearing 52 and the second conical roller bearing 53. A spacer to hold the distance between any one of the other ones is disposed between the other ones. It is only necessary that the nut 544 is locked to the other among the inner race 532 and the outer race 531 of the second conical roller bearing 53.

The first conical roller bearing 52 and the second conical roller bearing 53 are disposed in the directions opposite from one another. With the configuration where the end surfaces on the apex sides are opposed to one another, the inner race 532 of the second conical roller bearing 53 is displaceable in the axial direction of the tubular portion 513. That is, in this case, the inner race 532 of the second conical roller bearing 53 is relatively displaceable with respect to the inner race 522 of the first conical roller bearing 52. With the configuration where the end surfaces on the non-apex sides are opposed to one another, the outer race 531 of the second conical roller bearing 53 is displaceable in the axial direction of the tubular portion 513. That is, in this case, the outer race 531 of the second conical roller bearing 53 is relatively displaceable with respect to the outer race 521 of the first conical roller bearing 52. Thus, according to the directions of the first conical roller bearing 52 and the second conical roller bearing 53, any one of the inner race 532 and the outer race 531 of the second conical roller bearing 53 is relatively displaceable with respect to the identical one of the inner race 522 and the outer race 521 of the first conical roller bearing 52. The nut 544 can displace the outer peripheral surface of the tubular portion 513 of the second driven gear 51 in the axial direction. The movement of the nut 544 in the axial direction (that is, the adjustment of the fastening power of the nut 544) can adjust the preload applied to the first conical roller bearing 52 and the second conical roller bearing 53.

On the outer periphery of the tubular portion 513 of the second driven gear 51, the first conical roller bearing 52, the first spacer 541, the second conical roller bearing 53, and the nut 544 are disposed in an order from the side of the main body 511 (the front side). In these members, the first conical roller bearing 52 has the largest outer diameter and the outer diameters become smaller in the order from the first spacer 541, the second conical roller bearing 53, and the nut 544. In view of this, the outer diameter of the assembled gear/bearing module 5 decreases in phases from the side of the main body 511 of the second driven gear 51 (the front side) to the side of the male thread portion 516 (the rear side).

<Bearing Housing>

The following describes the exemplary configuration of the bearing housing 4. The bearing housing 4 is a member separate from the gear housing 13 housed inside the shift mechanism chamber 131 and secured. The main body 41 of the bearing housing 4 has a cylindrical shape and has a through-hole penetrating in the front-rear direction (the axial direction of the propeller shaft 16). On the inner peripheral side of the main body 41 of the bearing housing 4, the first bearing housing portion 411, a spacer housing portion 415, a second bearing housing portion 412, a nut housing portion 416, a third bearing housing portion 413, a fourth bearing housing portion 414, and a seal housing portion 417 are disposed in an order from the front side. A plurality of rib-shaped portions 43 are disposed on the outer peripheral side of the main body 41 integrally with the main body 41.

The first bearing housing portion 411 is a part housing and supporting the first conical roller bearing 52 and is a part with which the outer peripheral surface on the outer race 521 of the first conical roller bearing 52 is in contact. The dimension of the first bearing housing portion 411 in the axial direction is larger than the dimension of the outer race 521 of the first conical roller bearing 52 in the axial direction. The second bearing housing portion 412 is a part housing and supporting the second conical roller bearing 53 and is a part with which the outer peripheral surface on the outer race 531 of the second conical roller bearing 53 is in contact. The inner diameter of the first bearing housing portion 411 is configured according to the outer diameter of the outer race 521 of the first conical roller bearing 52 such that the first bearing housing portion 411 can house the first conical roller bearing 52. The inner diameter of the second bearing housing portion 412 is configured according to the outer diameter of the outer race 531 of the second conical roller bearing 53 such that the second bearing housing portion 412 can house the second conical roller bearing 53. The inner diameter of the spacer housing portion 415 is configured to be a diameter larger than the outer diameter of the first spacer 541 so as not to interfere with the first spacer 541. Note that, the inner diameter of the spacer housing portion 415 is smaller than the inner diameter of the first bearing housing portion 411, and a stepped surface 421, which faces forward, is disposed between the inner peripheral surface of the first bearing housing portion 411 and the inner peripheral surface of the spacer housing portion 415. The inner diameter of the nut housing portion 416 is configured to be a diameter larger than the outer diameter of the nut 544 so as not to interfere with the nut 544.

The seal housing portion 417 is disposed on the rearmost end on the inner peripheral side of the bearing housing 4. The fourth bearing housing portion 414 is disposed in front of the seal housing portion 417 and at the rear of the third bearing housing portion 413. The seal housing portion 417 is a part that houses a seal 633 for water proof between the outer peripheral surface of the propeller shaft 16 and the inner peripheral surface of the bearing housing 4. The fourth bearing housing portion 414 is a part that houses and supports the second radial bearing 602.

In the outer diameters of the respective bearings housed in the bearing housing 4, the first conical roller bearing 52 has the largest outer diameter and the outer diameters become smaller in the order from the second conical roller bearing 53, the third conical roller bearing 603, and the second radial bearing 602. The outer diameter of the first spacer 541 is smaller than the outer diameter of the outer race 521 of the first conical roller bearing 52 and is larger than the outer diameter of the outer race 531 of the second conical roller bearing 53. In view of this, the inner diameter of the main body 41 of the bearing housing 4 decreases in phases at least a part from the front end toward the fourth bearing housing portion 414 as approaching the rear side. The outer diameter of the seal housing portion 417 is preferably equal to or less than the outer diameter of the fourth bearing housing portion 414. With this configuration, the outer diameter of the main body 41 of the bearing housing 4 also decreases as approaching the rear side. As illustrated in FIG. 2 and FIG. 3, the outer diameter of the main body 41 of the bearing housing 4 may smoothly (continuously) decrease as approaching the rear side and may decrease in phases according to the inner diameter.

The plurality of rib-shaped portions 43, which are disposed on the outer peripheral side of the main body 41 of the bearing housing 4, each project to the outside in the radial direction of the main body 41 and extend in the front-rear direction. Besides, a gasket groove 418 is disposed near the front end portion on the outer peripheral surface of the main body 41 to fit a gasket 621. The gasket groove 418 seamlessly extends across the whole circumference in the circumferential direction.

<Attachment Structure of Gear/Bearing Module to Gear Housing>

The following describes the attachment structure of the gear/bearing module 5 to the gear housing 13. As illustrated in FIG. 2 and FIG. 3, the assembled gear/bearing module 5 is fitted to the main body 41 of the bearing housing 4 from the front side. The bearing housing 4 to which the gear/bearing module 5 is fitted is fitted to the inside of the shift mechanism chamber 131 from the rear side and is secured with a securing member 401.

The outer diameter of the gear/bearing module 5 is the largest on the front side and decreases in phases as approaching the rear side. On the other hand, the inner diameter of the bearing housing 4 decreases as approaching the rear side at the part from the front end to the third bearing housing portion 413. In view of this, the assembled gear/bearing module 5 can be fitted to the inside of the bearing housing 4 from the front side.

Fitting the gear/bearing module 5 to the main body 41 of the bearing housing 4 houses the first conical roller bearing 52 in the first bearing housing portion 411 and houses the second conical roller bearing 53 in the second bearing housing portion 412. The second shim 632 is interposed between the outer race of the first conical roller bearing 52 and the stepped surface 421, which is disposed between the first bearing housing portion 411 and the spacer housing portion 415. The sixth spacer 614 is positioned in front of the front end surface of the main body 41 of the bearing housing 4.

A stepped surface 135, which faces the rear side, is disposed on the inner peripheral side of the shift mechanism chamber 131 and between the lower drive shaft chamber 132 and the lower exhaust passage 134. A female thread portion 136 is disposed on the rear end portion on the inner peripheral surface of the shift mechanism chamber 131. The gear/bearing module 5 and the bearing housing 4 are housed from the rear side of the shift mechanism chamber 131. The securing member 401 is fastened to the female thread portion 136 on the shift mechanism chamber 131. The securing member 401 has an annular shape. The securing member 401 has a male thread fastenable to the female thread portion 136 on the shift mechanism chamber 131 on its outer periphery. With this configuration, the securing member 401 pushes the bearing housing 4 forward, and the surface on the front side of the sixth spacer 614 of the gear/bearing module 5 contacts the stepped surface 135 of the shift mechanism chamber 131. Thus, the gear/bearing module 5 and the bearing housing 4 are sandwiched between the stepped surface 135 of the shift mechanism chamber 131 and the securing member 401 so as to be housed in and secured to the shift mechanism chamber 131.

With this configuration, maintaining a state where the surface on the front side of the sixth spacer 614 contacts the stepped surface 135 of the shift mechanism chamber 131 maintains the bearing housing 4 positioned in the axial direction. The first conical roller bearing 52 is sandwiched between the stepped surface 421, which is disposed between the first bearing housing portion 411 and the spacer housing portion 415, and the sixth spacer 614 via the first shim 631 and the second shim 632. This positions the first conical roller bearing 52 in the axial direction with respect to the driving gear 31. To prevent the displacement in the axial direction by the load, the first conical roller bearing 52 is held so as not to, for example, cause a movement and an inclination in the axial direction.

On the other hand, the second conical roller bearing 53 is displaceably supported to the bearing housing 4. That is, the end surface on the rear side of the outer race 531 of the second conical roller bearing 53 does not contact the inner peripheral surface of the bearing housing 4 (such as the stepped surface facing the front side). In view of this, depending on the fastening state of the nut 544, for example, in the case of loose fastening, both the outer race 531 and the inner race 532 of the second conical roller bearing 53 are displaceable in the axial direction.

<Adjustment of Abutment of Teeth Between Immovable Gear and Second Driven Gear>

Figure 5:
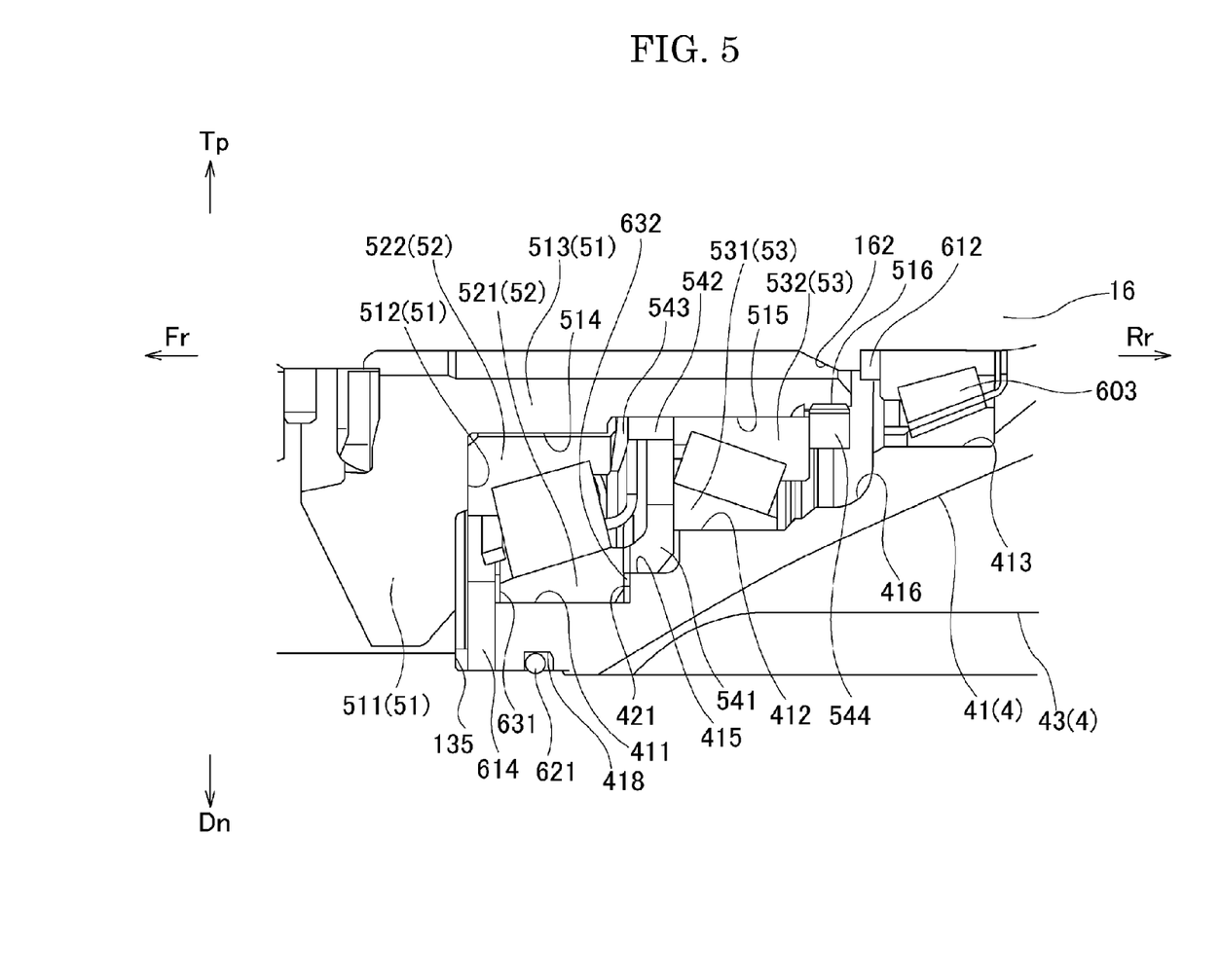
FIG. 5 is an enlarged view of FIG. 3.

The following describes a method for adjusting the abutment of teeth (a backlash) between the driving gear 31 and the second driven gear 51 with reference to FIG. 5. FIG. 5 is an enlarged view of FIG. 3 and a cross-sectional view schematically illustrating the configuration to adjust the abutment of teeth between the driving gear 31 and the second driven gear 51. The abutment of teeth between the driving gear 31 and the second driven gear 51 is determined by a positional relationship between the driving gear 31 and the second driven gear 51.

As illustrated in FIG. 5, in this embodiment, the second shim 632, which is disposed at the rear of the first conical roller bearing 52, specifies the positions of the driving gear 31 and the second driven gear 51 in the axial direction to specify the state of abutment of teeth. Specifically, the position of the bearing housing 4 in the front-rear direction (the axial direction of the second driven gear 51) is positioned when the front end surface of the bearing housing 4 contacts the stepped surface 135 of the shift mechanism chamber 131 via the sixth spacer 614. Fastening the securing member 401 to the rear side of the bearing housing 4 maintains the bearing housing 4 to be positioned. FIG. 5 illustrates the configuration that additionally interposes another annular-shaped spacer in front of the sixth spacer 614; however, the configuration is not limited to this. The other spacer illustrated in FIG. 5 may not interpose but the sixth spacer 614 may directly contact the stepped surface 135 of the shift mechanism chamber 131.

In this configuration, the first conical roller bearing 52 is interposed between the abutting portion 512 of the main body 511 of the second driven gear 51 and the stepped surface 421 of the bearing housing 4. Therefore, without the second shim 632, the second driven gear 51 is positioned with the stepped surface 421 via the first conical roller bearing 52. Interposing the second shim 632 between the outer race 521 of the first conical roller bearing 52 and the stepped surface 421 of the bearing housing 4 positions the second driven gear 51 together with the first conical roller bearing 52 at a position displaced to the front side by the thickness of the second shim 632. Thus, the second shim 632 adjusts the abutment of teeth between the driving gear 31 and the second driven gear 51.

The abutment of teeth between the driving gear 31 and the second driven gear 51 may individually differ depending on a tolerance of dimensions of the respective members of the gear housing 13, the bearing housing 4, and the gear/bearing module 5. In view of this, the abutment of teeth between the driving gear 31 and the second driven gear 51 is adjusted individually depending on the outboard motors 1. In this embodiment, an exchange between the first shim 631 and the second shim 632 adjusts this state of abutment of teeth. The abutment of teeth between the driving gear 31 and the second driven gear 51 can be checked only by the following work. The second driven gear 51, the sixth spacer 614, the first shim 631, the first conical roller bearing 52, and the second shim 632 are housed in the bearing housing 4. Then, the bearing housing 4 housing these members is temporarily attached to the gear housing 13. Therefore, the abutment of teeth between the driving gear 31 and the second driven gear 51 can be checked without the attachment of the members other than these members, namely, the second conical roller bearing 53, the first spacer 541, the second spacer 542, the biasing member 543, and the nut 544 to the second driven gear 51. This eases work of adjusting the abutment of teeth between the driving gear 31 and the second driven gear 51 (exchange between the first shim 631 and the second shim 632 and checking the abutment of teeth).

The first shim 631, which is disposed between the first conical roller bearing 52 and the sixth spacer 614, prevents or restrains the displacement of the first conical roller bearing 52. While the driving gear 31 transmits the rotative power to the second driven gear 51 and a back torque is applied from the second driven gear 51 to the driving gear 31, the radial load and the thrust load are applied to the second driven gear 51. The increase in this radial load possibly pushes and inclines the main body 511 of the second driven gear 51 to the lower side (the rotational center line of the second driven gear 51 inclines with respect to the rotational center line of the propeller shaft 16). Therefore, this embodiment disposes the first shim 631 in front of the outer race 521 of the first conical roller bearing 52. The first shim 631 covers a gap between the outer race 521 of the first conical roller bearing 52 and the sixth spacer 614 and pushes the outer race 521 of the first conical roller bearing 52 from forward. This prevents or restrains the displacement of the first conical roller bearing 52. Accordingly, this prevents or restrains the change in abutment of teeth, appropriately maintaining the state of abutment of teeth.

The dimension of the first bearing housing portion 411 in the front-rear direction (the dimension in the axial direction) is configured to be a dimension larger than the dimension of the outer race 521 of the first conical roller bearing 52 in the front-rear direction such that the position of the first conical roller bearing 52 in the front-rear direction is changeable. To allow the adjustment of the position of the first conical roller bearing 52 in the front-rear direction, the dimensions of the spacer housing portion 415 and the second bearing housing portion 412 in the front-rear direction are also configured to be dimensions with which the displacements of the first spacer 541 and the second conical roller bearing 53 in the front-rear direction are allowed. Furthermore, when the nut 544 is not fastened while the outer race 521 of the first conical roller bearing 52 contacts the stepped surface 421 directly or via the second shim 632, the first spacer 541 and the second conical roller bearing 53 are configured to be dimensions displaceable to the rear side. With this configuration, the first conical roller bearing 52 can receive the load in the axial direction applied to the second driven gear 51.

<Durability of Second Driven Gear>

An application of this shift mechanism 3 to the outboard motor 1 with C/R specification transmits the rotative power to move the outboard motor 1 forward from the driving gear 31 to the propeller shaft 16 via the second driven gear 51. Generally, the outboard motor 1 takes time for the forward movement longer than the rearward movement and transmits a larger rotative power. The displacement of the second driven gear 51 changes the state of abutment of teeth between the driving gear 31 and the second driven gear 51, being likely to cause an abrasion or a similar failure. Accordingly, to achieve an improvement in the durability of the driving gear 31 and the second driven gear 51, the displacement of the second driven gear 51 needs to be restrained and the abutment of teeth between the driving gear 31 and the second driven gear 51 needs to be appropriately maintained.

According to this embodiment, the first conical roller bearing 52 and the second conical roller bearing 53, which are disposed in the directions opposite from one another, receive the load applied to the second driven gear 51. Since the conical roller bearing can receive both the radial load and the thrust load, in the case where a large load is applied to the second driven gear 51, the displacement of the second driven gear 51 in the radial direction and the thrust direction can be restrained. This restrains the change in the abutment of teeth between the driving gear 31 and the second driven gear 51, holding the abutment of teeth appropriately. This ensures improving the durability of the driving gear 31 and the second driven gear 51.

According to this embodiment, the load applied to the propeller shaft 16 is not transmitted to the second driven gear 51. The third conical roller bearing 603, the fourth conical roller bearing 604, the thrust bearing 605, the first radial bearing 601, and the second radial bearing 602 receive the load applied to the propeller shaft 16. The propeller shaft 16 is movably inserted into the through-hole on the second driven gear 51 and does not directly engage the second driven gear 51. In view of this, the rotating state of the propeller shaft 16 does not affect the rotating state of the second driven gear 51. For example, even if the propeller shaft 16 is displaced or deformed by the load, the second driven gear 51 is not displaced. This ensures stabilizing the rotating state of the second driven gear 51 and preventing or restraining the change in the abutment of teeth between the driving gear 31 and the second driven gear 51.

<Preloads of First Conical Roller Bearing and Second Conical Roller Bearing>

According to this embodiment, when the gear/bearing module 5 is attached to the bearing housing 4, the change in preloads of the first conical roller bearing 52 and the second conical roller bearing 53 are prevented or restrained. That is, when the gear/bearing module 5 is attached to the bearing housing 4, a friction force occurs in the axial direction between the outer peripheral surface of the outer race 521 of the first conical roller bearing 52 and the inner peripheral surface of the first bearing housing portion 411. The friction force similarly occurs in the axial direction also between the outer peripheral surface of the outer race 531 of the second conical roller bearing 53 and the inner peripheral surface of the second bearing housing portion 412. Accordingly, when the outer race 521 of the first conical roller bearing 52 and the outer race 531 of the second conical roller bearing 53 can be displaced in the axial direction, this friction force may change the preloads applied to the first conical roller bearing 52 and the second conical roller bearing 53. Especially, the application of this friction force in the direction of biasing the outer races 521 and 531 of the first conical roller bearing 52 and the second conical roller bearing 53 to the apex side and biasing the inner races 522 and 532 to the non-apex side reduces the preloads.

In contrast to this, according to this embodiment, the outer races 521 and 531 of the first conical roller bearing 52 and the second conical roller bearing 53 are not displaceable to the front side. In view of this, even if an external force is applied by the attachment of the gear/bearing module 5 to the bearing housing 4 or similar work, the outer races 521 and 531 of the first conical roller bearing 52 and the second conical roller bearing 53 do not move in the axial direction with respect to the respective inner races 522 and 532. This prevents or restrains the change in preloads. Especially, this prevents or restrains the reduction in preload applied to the second conical roller bearing 53. Thus, according to the embodiment of the present invention, the preloads applied to the first conical roller bearing 52 and the second conical roller bearing 53 can be stabilized.

<Exhaust Air from Engine Unit>

The shift mechanism chamber 131 forms a part of the exhaust passage from the exhaust port of the engine unit 14 to the outside of the outboard motor 1. With the bearing housing 4 housed in the shift mechanism chamber 131, the clearance serving as a part of the exhaust passage is formed between the outer peripheral surface of the main body 41 of the bearing housing 4 and the inner peripheral surface of the shift mechanism chamber 131. The exhaust air from the engine unit 14 flows in this clearance (the shift mechanism chamber 131) through the upper exhaust passage 122, which is disposed at the drive shaft housing 12, and the lower exhaust passage 134, which is disposed at the gear housing 13. Since the shift mechanism chamber 131 is the opening open at the rear side, the exhaust air flowing in this clearance flows to the rear side and flows out to the outside through the exhaust passage disposed at the pusher propeller 17.

The outer diameter of the main body 41 of the bearing housing 4 decreases as approaching the rear side. With this configuration, a cross-sectional area of the clearance between the outer peripheral surface of the main body 41 of the bearing housing 4 and the inner peripheral surface of the shift mechanism chamber 131 (a cross-sectional area cut off along a surface perpendicular to the axis line of the propeller shaft 16) increases as approaching the rear side. This ensures decreasing a flow resistance of the exhaust air, securing a smooth flow of exhaust air. This ensures achieving the improvement in output from the engine unit 14 and a reduction in fuel consumption.

These are detailed descriptions of the embodiments according to the present invention with reference to the drawings. However, the embodiments described above are merely specific examples of embodying the present invention. The technical scope of the present invention is not limited to the embodiments described above. It is possible to make various modifications to the present invention within the scope thereof, and these are also included in the technical scope of the present invention.

For example, the embodiment includes the first conical roller bearing 52 and the second conical roller bearing 53 opposed to one another at the end surfaces on the apex sides; however, the configuration is not limited to this. For example, the end surfaces on the non-apex sides may be opposed to one another. The second spacer 542 may not be disposed. This configuration can also provide the effects similar to the above-described configuration.

The present invention is a technique preferable for the supporting structure for gear of outboard motor. According to the present invention, while the downsizing of the supporting structure for gear of outboard motor (space saving of the arrangement space) is achieved, the preload applied to the conical roller bearing can be stabilized and the looseness of the nut securing the conical roller bearing can be restrained.

According to the present invention, with an object to be solved by the present invention, the behavior of the driven gear that transmits the rotative power during forward movement can be stabilized and the displacement of the driven gear can be restrained. This ensures restraining the change in the relative positional relationship between the driving gear and the driven gear, thereby ensuring appropriately holding the abutment of teeth.

What is claimed is:

1. A supporting structure for a gear of an outboard motor, comprising:
   a first driven gear disposed in front of a driving gear to mesh with the driving gear, the driving gear rotating through transmission of a rotative power from a driving power source;
   a second driven gear that has a tubular portion concentrically to a rotational center line, the second driven gear being disposed at a rear of the driving gear to mesh with the driving gear;
   a first conical roller bearing and a second conical roller bearing disposed on an outer periphery of the tubular portion of the second driven gear in directions opposite from one another;
   a compressible and deformable biasing member disposed between an inner race of the first conical roller bearing and an inner race of the second conical roller bearing, the biasing member biasing the inner race of the first conical roller bearing and the inner race of the second conical roller bearing in directions separate from one another;
   a spacer disposed between an outer race of the first conical roller bearing and an outer race of the second conical roller bearing to maintain a distance between the outer race of the first conical roller bearing and the outer race of the second conical roller bearings; and
   a supporting member disposed displaceable in an axial direction of the tubular portion, the supporting member being locked to the outer race of the second conical roller bearing to hold the first conical roller bearing and the second conical roller bearing to the tubular portion of the second driven gear, wherein
   the inner race of the first conical roller bearing and the inner race of the second conical roller bearing are relatively displaceable in an axial direction.

2. The supporting structure for the gear of the outboard motor according to claim 1, wherein:
   the first conical roller bearing and the second conical roller bearing are disposed in directions opposed to one another at sides where apexes of orbit planes of the outer races and the inner races of the first conical roller bearing and the second conical roller bearing are positioned.

3. A supporting structure for a gear of an outboard motor, comprising:
   a first driven gear disposed in front of a driving gear to mesh with the driving gear, the driving gear rotating through transmission of a rotative power from a driving power source;
   a second driven gear that has a tubular portion concentrically to a rotational center line, the second driven gear being disposed at a rear of the driving gear to mesh with the driving gear;
   a first conical roller bearing and a second conical roller bearing disposed on an outer periphery of the tubular portion of the second driven gear in directions opposite from one another;
   a compressible and deformable biasing member disposed between an outer race of the first conical roller bearing and an outer race of the second conical roller bearing, the biasing member biasing the outer race of the first conical roller bearing and the outer race of the second conical roller bearing in directions separate from one another;

a spacer disposed between an inner race of the first conical roller bearing and an inner race of the second conical roller bearing to maintain a distance between the inner race of the first conical roller bearing and the inner race of the second conical roller bearing; and a supporting member disposed displaceable in an axial direction of the tubular portion, the supporting member being locked to the inner race of the second conical roller bearing to hold the first conical roller bearing and the second conical roller bearing to the tubular portion of the second driven gear, wherein the outer race of the first conical roller bearing and the outer race of the second conical roller bearing are relatively displaceable in an axial direction.

4. The supporting structure for the gear of the outboard motor according to claim 3, wherein the first conical roller bearing and the second conical roller bearing are disposed in directions opposed to one another at sides where apexes of orbit planes of the outer races and the inner races of the first conical roller bearing and the second conical roller bearing are positioned.

\* \* \* \* \*